United States Patent [19]
Seppa

[11] Patent Number: 5,235,861
[45] Date of Patent: Aug. 17, 1993

[54] POWER TRANSMISSION LINE MONITORING SYSTEM

[76] Inventor: Tapani O. Seppa, 39 N. Valley Rd., Ridgefield, Conn. 06877

[21] Appl. No.: 695,096

[22] Filed: May 3, 1991

[51] Int. Cl.$^5$ .............................................. G01L 5/04
[52] U.S. Cl. ........................... 73/862.391; 73/862.541
[58] Field of Search ................. 73/862.39; 307/62; 340/870.3; 174/40 R, 40 TD, 45 R, 45 TD, 149 R; 364/492, 508, 550, 556

[56] References Cited

U.S. PATENT DOCUMENTS

| | | | |
|---|---|---|---|
| 3,073,156 | 1/1963 | Rowe | 73/862.39 |
| 3,098,988 | 7/1963 | Hafner | 174/40 TD |
| 3,759,094 | 9/1973 | Al | 73/862.39 |
| 4,402,229 | 9/1983 | Byrne | 73/862.39 |
| 4,409,429 | 10/1983 | Gaylard | 174/40 TD X |
| 4,786,862 | 11/1988 | Sieron | 324/127 X |
| 4,837,800 | 6/1989 | Freeburg et al. | 455/33.3 X |

FOREIGN PATENT DOCUMENTS

| | | | |
|---|---|---|---|
| 0011624 | 1/1986 | Japan | 73/862.39 |
| 0754541 | 8/1980 | U.S.S.R. | 174/40 TD |
| 0974483 | 11/1982 | U.S.S.R. | 174/40 TD |

*Primary Examiner*—Richard E. Chilcot, Jr.
*Assistant Examiner*—Elizabeth L. Dougherty
*Attorney, Agent, or Firm*—Edward R. Hyde

[57] ABSTRACT

A system for determining the sag of an overhead power transmission line to prevent flashover to adjacent objects on earth. A tension measuring device is provided to produce a sign as a function of powerline tension. The signal is processed and transmitted to a distant location by cellular communication to a distant central monitoring station. Knowing the sag-tension relationship of the monitored line the sag is determined. Thus action may be taken if the powerline sag becomes excessive.

9 Claims, 2 Drawing Sheets

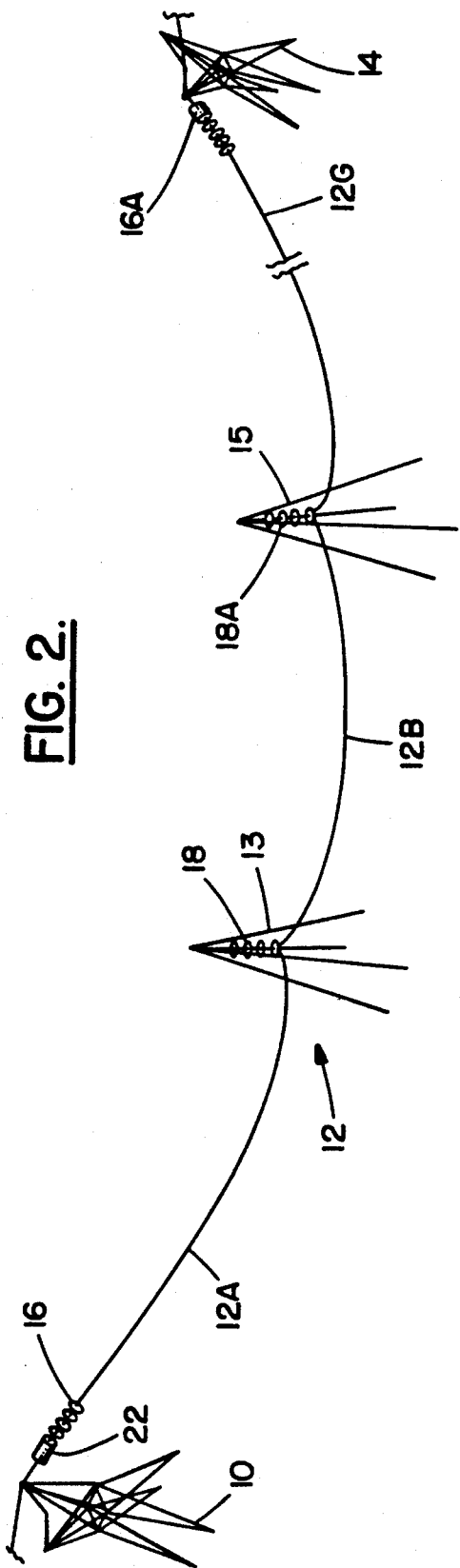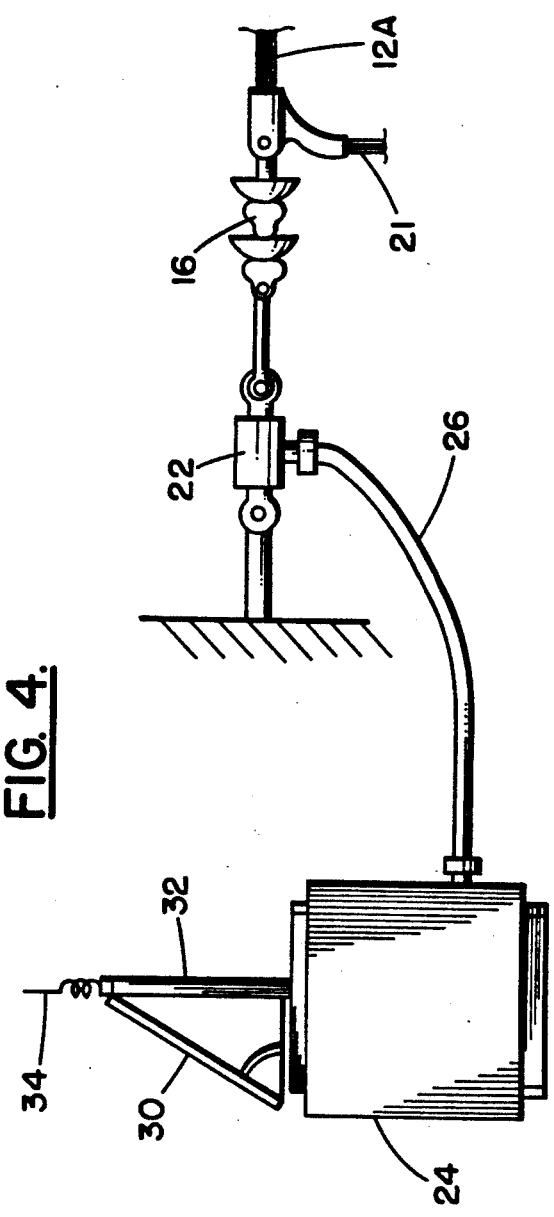

5,235,861

POWER TRANSMISSION LINE MONITORING SYSTEM

BACKGROUND OF THE INVENTION

1. Field of the Invention

This invention relates to a system used for monitoring the transmission capability of electrical power transmission lines. The transmission capability of power lines will vary with the temperature of the line because the current carrying capacity is limited by the allowable sag of the line between transmission towers. In order to adequately control the load on a line it is necessary to know the condition of the line in terms of the sags of its spans. The present invention provides a system for monitoring such overhead transmission lines so that the load on the line may be adequately and properly controlled.

2. Description of the Prior Art

A major problem in overhead power transmission lines is that of clearance between the line and the nearest point on earth. If the line becomes too close to the earth or adjacent structures, problems can arise from electric flashover from the power line which can cause extensive electrical damage. For this and other reasons it is necessary to limit the current of these transmission lines so that any undue sag may be prevented. The major cause of increased sag is that of heating of the line. As the temperature increases the power line expands and clearance problems may arise.

The heating of the line results from various sources. One cause is the heat that is generated in the conductor by the electrical current flowing through it which causes $I^2R$ losses in the conductor. Thus as the current in the line increases there is a greater generation of heat with the resulting increase in line sag. Line heating is also effected by solar heat and ambient temperature in the surrounding area. This heating of the line is offset by the cooling effect of wind passing over the line and heat radiated from the conductor.

Traditionally, transmission lines were rated based on an assumed combination of worst cooling conditions, consisting of a combination of expected highest ambient temperature, solar radiation and a low wind speed. Such traditional current ratings were highly conservative. To take adavantage of this conservatism, methods have been developed to either monitor some of the cooling conditions or the actual temperature of the conductor and to adjust current ratings based on such monitored data.

In the prior art, a number of methods have been used for determining line temperature. A first such method is that of theoretical calculation. Assumptions are made of wind speed and direction, ambient temperature and solar radiation and calculations are made for arriving at the line condition. Because the calculations are based on theoretical assumptions, the result can be at considerable variance from the actual line condition which might permit greater line current than exists or on the other hand dictate a lower actual line current.

In some instances weather stations have been established in the general location of the transmission line in order to monitor the weather to thus provide somewhat more reliable data that is then used to calculate the line conditions including the temperature of the line. A third method for monitoring the line known to the prior art is to provide sensor devices mounted on the conductor along the length of the line at various intervals to measure conductor temperatures from which load capacity can be determined. These various systems of the prior art are disclosed for example in U.S. Pat. Nos. 4,268,818 and 4,420,752 and 4,806,855. These later monitors have been somewhat more effective in identifying actual temperatures of the conductors. However one drawback of such systems has been that such sensors provide a measurement only at one point on the line and large number of sensors are thus required to cover a long span or series of spans because temperatures will vary considerably along the length of a span. Further they require extensive special communications methods such as FCC site specific radio licenses. Furthermore, because the sensor modules are mounted on the energized conductor, the manufacturing and installation cost of the sensors is complicated and expensive.

A further disadvantage of the prior, conductor temperature based, rating methods is that they cannot take into account creep, which is progressive stretching of conductor, caused by variation of conductor loading. The design sag and tension tables of conductors, such as the one shown in Table 1, determine the conductor tension and sag in initial condition (before any creep) and final condition (after calculated maximum creep). As shown in Table 1, the resulting uncertainty between the sags can be more than 10% of sag, and equivalent to a temperature uncertainty of 25 to 30 degrees C. This uncertainty is eliminateed if the lines are rated based on conductor tension.

SUMMARY OF THE INVENTION

The present invention overcomes the disadvantages of the prior art by monitoring line tension which remains substantially constant over several spans of the transmission line. The measurements are recorded in a module located at a transmission tower and processed to determine that the lowest design tension, corresponding to the maximum allowable sag, is not exceeded. Because the tension of the line varies relatively slowly with a typical time constant of 10 to 15 minutes, the tension measurement may be made intermittently with the interval between measurements depending upon the size of the line conductor. The collected data is transmitted to a distantly located central processing station.

The communications can be based on any available common carrier or dedicated communications system. Nevertheless, because of the remote location of the measurement systems and the infrequent need for communication, the invention envisions use of cellular telephone communications as the preferred communications method. Likewise, because the power demand of the system is very low it can be powered by many commercial sources. In remote locations it is envisioned that the most economical power source is likely to be solar cells which feed a backup battery.

It is therefore a primary object of the present invention to provide a system for monitoring the condition of an overhead transmission powerline to provide efficient operation thereof.

It is further object of the present invention to provide a transmission powerline monitoring system in which sensors are provided at intervals along the line that measure the tension of either individual line spans, or multi-span sections of the line.

Another object of the present invention is to provide a method for measuring the tension of spans of an overhead transmission powerline and efficiently transmit the measured information to a distant central processing station.

It is still further object of the present invention to provide a system for measuring and monitoring the tension of spans of an overhead transmission line and utilize the measurements to calculate the optimum load carrying capacity of the transmission line.

BRIEF DESCRIPTION OF THE DRAWINGS

The foregoing and still other objects and advantages of the present invention will be more apparent from the following detailed explanation of the preferred embodiments of the invention in connection with the accompanying drawings herein in which:

FIG. 2 is a portion of a transmission line suspension system;

FIG. 4 is a schematic view of the sensor and associated module.

DESCRIPTION OF THE PREFERRED EMBODIMENT

An overhead transmission powerline comprises a series of transmission towers having spans of transmission line swung between them. The portion of the transmission line between adjacent towers is customarily designated a span and a series of such spans make up a suspension section. Each end of a suspension section is secured to a tower by a strain insulator structure which is subject to the full tension of the line connected to it. The individual suspension spans on the other hand, terminate at their respective towers by suspension insulator strings which permit significant longitudinal movement of the ends of the suspension spans.

Figure 1:
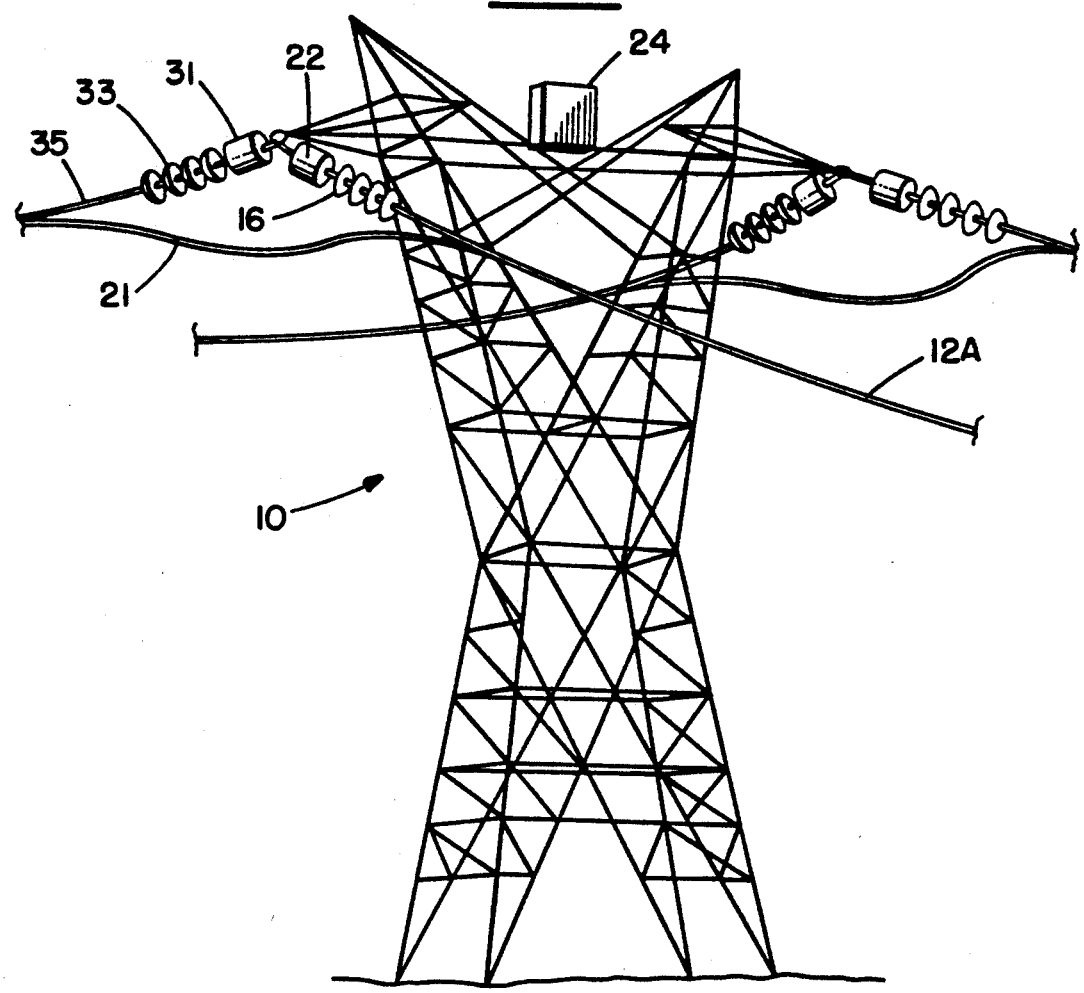
FIG. 1 is a view of a transmission tower having electric power transmission lines showing schematically the system of the present invention.

Referring now to FIGS. 1 and 2, 10 indicates a transmission tower that terminates a suspension section of a power transmission line generally indicated by 12. The section is made up of a number of suspension spans 12A, 12B to 12G which terminates at its tower 14. The terminal ends of the section are secured to their respective towers 10 and 14 through strain insulator strings, also known as dead end strings 16 and 16A. The intermediate suspension spans are secured to their respective towers by suspension strings in such a manner that the ends of the spans may move laterally and longitudinally.

For example, span 12B is secured at its ends to suspension strings 18 and 18A which are suspended in a vertical manner to their respective towers represented diagrammatically, as 13, 15. Thus the strain structures 16, 16A are subject to the full tension of the line. Because the suspension strings 18, 18A hang from their respective towers permitting longitudinal movement of the end of the sections, the horizontal tension equalizes and is substantially constant throughout the suspension section.

One end of each suspension section has a tension measuring device interposed between the strain insulator and the associated tower.

Thus the end of the section of powerline 12 joins to tower 10 through the strain insulator 16 and the tension measuring device 22. The latter may be a load cell of the strain gauge type and it has been found that a commercially available load cell such as the Allegheny 301 is very satisfactory for this purpose. Although the line 12 secures to tower 10 it does not terminate but rather continues on to the next adjacent tower as shown by 21 in FIG. 1.

As the temperature varies, the powerline 12 will expand or contract with a corresponding change in tension. The tension will substantially equalize throughout the length of the section because of the suspension string sections 18, 18A, etc. and this tension will be measured by load cell 22. The latter is connected to a console 24 by a shielded cable 26 and is secured to any convenient position on the transmission tower 10.

Figure 3:
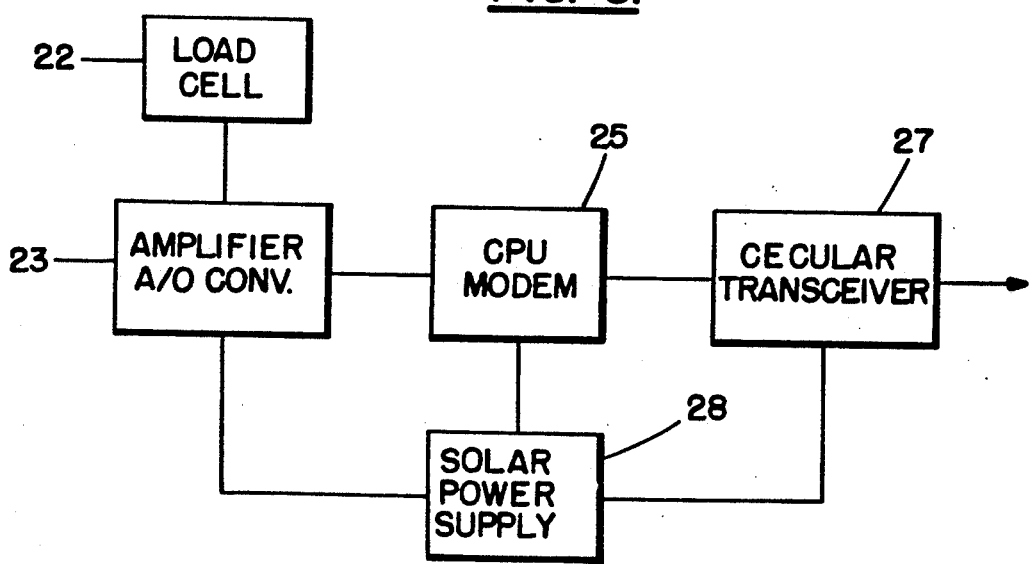
FIG. 3 is a general block diagram of the components of a sensor module.

The console 24 will contain the various electrical components shown in FIG. 3. The analog signal from the load cell 22 is passed to an amplifier and then to bridge amplifier and A/D converter 23 which converts it to digital form. This digital signal is then connected to a CPU 25 where it is appropriately processed as will be hereinafter described and passed through to a cellular transceiver 27. The various components of the module are powered by a solar power supply 28. The latter is shown in FIG. 4 as a solar array 30 held up by a mast 32 which also supports the cellular transceiver antenna 34.

Thus it is seen that the tension of the section is monitored by the system and the results of the tension measurement may be conveyed through the cellular transmission link to a central station where the tension is converted to line sag measurement. It is understood that for a particular type of powerline conductor and span length the relationship between tension and sag is known. For transmission line spans of moderate length and on level ground, one can use with high accuracy the simple parabolic formula:

$$D = \frac{ms^2}{8H},$$

in which: D=sag, m=conductor weight/unit length s=span length and H=horizontal tension.

Thus the sag of a given span is inversely proprotional to the horizontal component of the tension. The required simple computation for the sags of each span of the suspension section can be done either at the modules located at transmission towers or at the central processing station.

Slightly more complex, hyperbolic, equations for sag computation are used for exact determination of sags for inclined or long spans. Standardized software packages are commercially available for such calculations. Conductor manufacturers generally provide such data. For example, the Aluminum Company of America provides a sag tension table for a 1000 ft. span of conductor designated ACSR Drake, 795.0 KCMIL, 26/7 stranding for which the stress-strain data is as follows:

| FINAL | | INITIAL | |
|---|---|---|---|
| SAG FT | TENSION LB | SAG FT | TENSION LB |
| 24.99 | 12592. | 24.97 | 12600.* |
| 18.79 | 7292. | 16.99 | 8060. |
| 20.84 | 6578. | 18.64 | 7350. |
| 22.86 | 5999. | 20.35 | 6735. |
| 24.82 | 5527. | 22.08 | 6209. |
| 26.72 | 5137. | 23.81 | 5760. |
| 28.79 | 4771. | 25.75 | 5329. |

For the actual design of the suspension sections of the line, the design engineer uses sag/tension tables as the one shown above and has designed each of the spans of the suspension section in such a manner that the sag limitations will not be violated if the longitudinal component of tension remains higher than the particular tension which he concluded is the low limit of the longitudinal component of tension.

Thus, with knowledge of the tension, the operator at the distant location can appropriately adjust the electrical current of the line to insure that the critical sags for the particular line are not exceeded. Use of tension as the primary determining factor for thermal rating eliminated the uncertainty of the conductor creep. It also allows accurate rating a complete suspension section of the line with single monitoring device.

The system may operate in various modes and as described above, there may be a continuing monitoring of the tension which is passed on to a central station where the sags can be determined and the system appropriately managed. An alternative arrangement would be to sample the tension at predetermined intervals under the control of a clock in the CPU at the tower module. The sampling might, for example, be made every five or ten minutes. These intermittent results of the line tension would be stored in the system and transmitted to the central station on demand.

Another mode would be to have a critical alarm tension programmed into the computer and when the line tension approaches the critical tension an alarm would be transmitted to the central station. The alarm conditions could be selectively programmed to the computer software depending on the particular user's practices. Changes in operation of the system can be made using the cellular communication from the ground station to the tower module.

An additional feature of the system is that the same electronic console 24 may also process the tension of the next succeeding suspension section. As seen in FIG. 1, a load cell 31 and strain insulator 33 secures the end 35 of the next section to tower 10. The load cell connects by a shielded cable (not shown) similar to cable 26 to the console. Thus two adjacent sections may be conveniently monitored and the results transmitted to the distant central station by the same set of computer and communication equipment.

The invention has been described in which tension is measured directly by a load cell. Alternatively, tension may be determined indirectly with an inclinometer at the dead end strings in a similar location as the load cell shown in the drawings. The inclinometer would measure the incline angle of the line. Because the verticle component of the load remains constant and equal to the weight of the span, the horizontal load can be resolved from the equation $$H = W\alpha$$

where
W = known verticle load and
α = inclination angle.

The inclinometer may be any of a number that are commercially available.

Having thus described the invention with particular reference to the preferred forms thereof, it will be obvious that various changes and modifications may be made therein without departing from the spirit and scope of the invention as defined in the appended claims.

What is claimed is:

1. A system for measuring the sag of an overhead power transmission power line comprising:
   a power transmission line section having two terminal ends;
   two section terminal transmission towers;
   strain insulator means to secure each terminal end of the power line section to a respective section transmission tower;
   intermediate transmission towers spaced in a line between the terminal towers;
   suspension insulator means to secure intermediate points of the power transmission line section to respective intermediate transmission towers;
   said suspension insulator means to permit longitudinal movement of the power line;
   tension measuring means interposed between each strain insulator means and the respective terminal transmission tower to produce an electrical signal representative of the power line tension;
   signal processing means located at and connected to the tension measuring means;
   said signal processing means including programmed computer means to produce second electrical signals which are a function of the sag of the power line; and
   transceiver means connected to the computer means to transmit the second electrical signals to a distant location whereby current in the power line is adjusted in accordance with the received second electrical signals.

2. The system set forth in claim 1, including means at the distant location to transmit control signals to the said transceiver means to control the signal processing means.

3. A method for monitoring the sag of an overhead power transmission line comprising the steps of:
   measuring the tension of the power line;
   producing an electrical signal representative of the tension measurement;
   processing said electrical signal in accordance with a predetermined tension-sag relationship to produce a second signal which is a function of sag of the power line;
   transmitting said second electrical signal to a distant location in a predetermined transmission mode;
   receiving the second signal at the distant location whereby current in the power line is adjusted in accordance with the received second signal.

4. The method set forth in claim 3 in which the transmission mode is a continual transmission of the processed signal.

5. The method set forth in claim 3 in which the transmission mode i san intermittent transmission of the processed signal.

6. The method set forth in claim 3 in which the transmission mode is a transmission of the processed signal of a predetermined threshold.

7. The method set forth in claim 3 in which the data transmission method is a cellular radio telephone.

8. The method set forth in claim 3 in which the step of measuring the tension of the power line includes the steps of measuring the inclination angle of the power line and calculating the horizontal load of the power line.

9. The method set forth in claim 3 in which the second electrical signal is a function of power line sag in accordance with the formula $$D = \frac{ms^2}{8H},$$

which
D = sag.
m = conductor weight/unit length
S = span length and
H = horizontal tension.

* * * * *